United States Patent [19]

Truninger

[11] Patent Number: 4,679,381
[45] Date of Patent: Jul. 14, 1987

[54] APPARATUS FOR AND METHOD OF LOADING ELONGATED ARTICLES

[76] Inventor: Paul Truninger, Industriestr. 9, CH-Langendorf/Solothurn, Switzerland

[21] Appl. No.: 632,410

[22] Filed: Jul. 19, 1984

[30] Foreign Application Priority Data

Jul. 20, 1983 [DE] Fed. Rep. of Germany ....... 3326152
Mar. 16, 1984 [DE] Fed. Rep. of Germany ....... 3409780

[51] Int. Cl.⁴ ...................... B65B 35/50; B65B 35/30; B65B 35/44; B65B 5/10
[52] U.S. Cl. ........................................ 53/447; 53/448; 53/475; 53/537; 53/540; 53/247; 414/83
[58] Field of Search ................. 53/531, 536, 537, 540, 53/245, 247, 236, 444, 447, 448, 475; 414/83, 42

[56] References Cited

U.S. PATENT DOCUMENTS

| | | | |
|---|---|---|---|
| 2,686,603 | 8/1954 | Lawson | 414/83 X |
| 2,730,247 | 1/1956 | Lawson | 414/83 |
| 3,049,844 | 8/1962 | Leitzel | 53/536 X |
| 3,425,186 | 2/1969 | Hageline | 53/247 |
| 3,610,443 | 10/1971 | Berge . | |
| 3,860,128 | 1/1975 | Lunden | 414/42 |
| 4,193,725 | 3/1980 | Schiepe et al. | 414/83 |
| 4,201,506 | 5/1980 | Rysti . | |
| 4,264,253 | 4/1981 | Kennison | 414/83 |

FOREIGN PATENT DOCUMENTS

1602861 11/1981 United Kingdom .

Primary Examiner—Horace M. Culver
Attorney, Agent, or Firm—Henry M. Feiereisen

[57] ABSTRACT

A loading apparatus for elongated articles comprises a first conveying device for transporting the articles from a ready-supply station to an aligning and gathering apparatus and then to a layer-forming apparatus, from where they are transported layerwise by means of a second conveying device into a container in which they are stacked in layers on a support which is lowerable stepwise. The first conveying device comprises a plurality of beams which are movable in and oppositely to the conveying direction and are liftable and lowerable. The aligning and gathering apparatus comprises a plurality of abutments past which the beams are movable, the articles lying on them being held fast so that they are aligned parallel to each other and pushed into lateral contact with each other. The layer-forming apparatus comprises a stationary support whose supporting surface is just as wide as one layer in the container. The second conveying device comprises conveying arms which are movable in and oppositely to the conveying direction and are liftable and lowerable. Two conveyor belts arranged one in succession to the other in the conveying direction can also be used for aligning and gathering the elongated articles and for layer forming.

40 Claims, 30 Drawing Figures

APPARATUS FOR AND METHOD OF LOADING ELONGATED ARTICLES

FIELD OF THE INVENTION

The invention relates to an apparatus for and method of loading elongated articles from a preparation or supply station into a container, for purposes of e.g. further processing or shipment of the elongated articles. By elongated articles there are understood workpieces such as e.g. rods, tubes, bars and sections in commercial lengths made from any material such as e.g. light metal, steel, non-ferrous metal or synthetic plastic material.

BACKGROUND OF THE INVENTION

The loading of such long stock items into containers such as e.g. baskets, transport containers, cases and frames, or into stacking yokes or trestles, is at the present time still mainly done by hand, lifting gear being used as aids at best when relatively considerable item weights have to be dealt with. The elongated articles are conveyed individually or in collections of several items at a time with a conveying device such as e.g. a roller table, to the working station or the supply station, whence they are taken by hand or with the use of lifting gear and introduced into the container.

OBJECT OF THE INVENTION

Loading elongated articles in this way is time-consuming and costly.

The invention has as its object to provide an apparatus, for the loading of elongated articles from a supply station into a container, which apparatus can automatically, i.e. without the assistance of operatives, take over the elongated articles present at the supply station and stack these in layers in the container.

SUMMARY OF THE INVENTION

This object is achieved by a loading apparatus which has the following features:

(a) an apparatus for the forming of layers of predetermined width of aligned elongated articles situated in lateral contact with one another, (b) a first conveying device for conveying elongated articles in a direction of conveyance transversely to their longitudinal extent from the supply station to the layer-forming apparatus, and (c) a second conveying apparatus for conveying elongated articles layerwise from the layer-forming apparatus to the container.

The loading apparatus according to the invention has the advantage that the layer width of the stack forming in the container is completely independent of the width of a possible roller table preceding the loading apparatus according to the invention.

Preferably the layer-forming apparatus comprises a stationary support with a supporting surface whose width is so chosen that just that number of elongated articles can find room side by side which constitutes one layer of a stack of elongated articles being formed in the container. The first conveying device preferably has at least two beams for transporting elongated articles from the supply station in a direction transversely to their longitudinal extent to the stationary support. The beams are aligned in the conveying direction, movable in and oppositely to the conveying direction, and liftable and lowerable. A drive apparatus is also provided for moving the conveying beams.

Preferably the second conveying device has at least two arms for transporting to the container, in a direction transversely to their longitudinal extent, elongated articles lying on the supporting surface of the stationary support. The arms are aligned in the conveying direction, are movable in and oppositely to the conveying direction, and liftable and lowerable. A drive apparatus is also provided for moving the conveying arms.

Preferably the loading apparatus according to the invention has an apparatus for the aligning and gathering of elongated articles in such a manner that these are situated parallel to the longitudinal axis of the container and adjacent one another laterally. The aligning and gathering apparatus can have a stationary abutment for pushing-together the elongated articles lying on the conveying beams, transversely to their length, the conveying beams being movable past said stop in or oppositely to the conveying direction, the abutment retaining relatively to the conveying beams the elongated articles lying thereon. As a result the advantage is obtained that the loading apparatus according to the invention can be used also in cases where the elongated articles do not arrive at the supply station already gathered and aligned parallel to one another, but lie there obliquely with respect to each other.

Preferably the supporting surface of the stationary support is capable of having its width increased or reduced, so that the advantage is afforded that the layer width of the stack is variable, and therefore it is possible to use containers with interior spaces of varying widths.

At least one edge bounding the supporting surface of the stationary support in the sense of its width can be bevelled so that excess elongated articles are separated from the layer being formed in a manner which does not harm the surfaces.

The stationary abutment can be provided on the support and so arranged that its abutment surface is situated above the edge of the supporting surface of the support remote from the supply station, is disposed vertically, and is directed against the direction of conveyance of the elongated articles.

Preferably the aligning and gathering apparatus has a further abutment between the supply station and the stationary support, being so arranged that its abutment surface is vertically disposed and is directed in the conveying direction. The conveying beams are then so liftable that the elongated articles lying on them are movable in the conveying direction over this further abutment. In this way the advantage is afforded that the elongated articles can be pushed together from both sides in the direction transversely to their length, so that the distance over which the individual elongated article must travel in the pushing-together process until all the items of a layer are aligned parallel to one another is shorter than if the pushing-together were effected only from one side by means of one abutment. But the less the elongated articles have to be displaced on the conveying beams, the less the risk is that the surface of the elongated articles will be damaged by displacement on the conveying beams.

Handling the elongated articles during this transport from the supply station to the stationary support in a manner avoiding damage to the surfaces can be ensured by providing that the conveying beams are provided at their top side with a surface-conserving sliding coating consisting for example of synthetic plastic material or graphite.

By using a sliding coating on that surface of the first conveying device which supports the elongated articles, most kinds of elongated articles can be pushed together to lie side by side without difficulty by means of the abutments. However, with many kinds of elongated articles such as e.g. those which have sloping side edges, it may happen that they slide over one another when they are moved against the abutments, so that the formation of layers of elongated articles adjacent one another only laterally is made difficult.

The risk of being pushed on top of one another in the aligning and gathering of the elongated articles is eliminated and satisfactory layer formation is ensured if the loading apparatus has the following features:

(a) an apparatus for the aligning and gathering of elongated articles in such a manner that they are situated parallel to the longitudinal axis of the container and laterally adjacent one another, (b) an apparatus for forming layers of predetermined width of aligned and laterally adjacently disposed elongated articles, (c) a first conveying device for transporting elongated articles, in a direction of conveyance transversely to the longitudinal extent of said articles, from the ready-supply station to the aligning and gathering apparatus, and (d) a second conveying device for layerwise conveying of elongated articles from the layer-forming apparatus to the container.

Preferably the aligning and gathering apparatus comprises at least two (a first and a second) conveyor belts arranged one in succession to the other in the conveying direction and movable intermittently at the same speed in the conveying direction. One of the belts is located adjacent to the supply station so as to be able to take over elongated articles from the first conveying device and feeds them successively to the second belt, from which they can be conveyed away layerwise by the second conveying device. The aligning and gathering apparatus also preferably comprises an apparatus which controls the operation of the second belt and on the orders of which the second belt can be stopped whilst the first belt continues to move, if the elongated articles lying on the first belt are unaligned or have lateral spacings from one another, and under the orders of which the second belt moves again at the same speed as the first belt when the elongated articles transported from the first belt on to the second belt are aligned and adjoin one another laterally.

The loading apparatus according to the invention constructed in this way has the advantage that the elongated articles cannot be pushed over one another during the aligning and gathering, since only the elongated articles lying on the first conveyor belt are displaced at aligning and gathering, whereas the already aligned and gathered elongated articles lie on the second conveyor belt and are no longer displaced relatively to the belt. Thus the number of elongated articles to be displaced drops continually whereas in the case of the loading apparatus described initially it remains constant until all the elongated articles are aligned and pushed to lateral contact with one another on the first conveying device.

The conveying arms can be so tiltable that their free ends can be lifted higher than their rear ends, and at the rear ends of the conveying arms, on the top side thereof, an abutment can be provided for securing elongated articles lying on the conveying arms against slipping off. This allows the possibility that the loading apparatus according to the invention can be used for the loading of any shapes of sections, more particularly round stock and tubes, since when lifting such articles from the support or the second conveyor belt the conveying arms can be tilted rearwardly, so that the articles cannot roll or slip off over the free ends of the conveying arms. The abutment at the rear ends of the conveying arms ensures that the articles cannot slip off or fall off over the rear ends of the conveying arms more particularly when the conveying arms are in the rearwardly tilted position. The conveying arms are preferably flat at their top and bottom sides and their surfaces top and bottom form an acute angle at the free ends. As a result it is possible for the elongated articles lying on the conveying arms to be deposited directly, i.e. without falling, on the floor of the container or on to the uppermost layer of the stack, so that damage to the elongated articles can be avoided when depositing.

A support liftable and lowerable in the container can also be provided, whereon the elongated articles can be stacked in layers by the conveying arms and which can be lowered stepwise by in each case the height of a layer of elongated articles in the container, and in that case the container must have an opening in its bottom through which the support can be moved. As a result the plane in which elongated articles are transferred from the conveying arms to the support or to the stack is always kept at the same height. The loading apparatus according to the invention also has the advantage that existing containers which already have an opening in their bottom through which the support can be moved, such as e.g. tubular frame structures or stacking trestles, can be used without requiring modification.

Alternatively a liftable and lowerable support can be provided for holding the container, in which the elongated articles are stacked in layers by the conveying arms, and the support is then alternately lowerable to such an extent that the elongated articles lying on the conveying arms are movable over one side wall of the container, and liftable to such an extent that the elongated articles lying on the conveying arms are depositable on the container bottom or on the uppermost layer of the stack formed in the container, and the side wall of the container has for each conveying arm an aperture into which the respective conveying arm enters when the support is elevated and lowered. As containers there can be used more particularly cases which simply have to be provided with the apertures for the conveying arms to be ready for use.

Preferably each layer of elongated articles of the stack formed in the container rests on a thin intermediate sheet, and the conveying arms always take an intermediate sheet from a magazine of such intermediate sheets before they lift the particular layer of elongated articles concerned from the stationary support or the second conveyor belt. Because of the intermediate layers the elongated articles can be stripped off the conveying arms without surface damage on to the bottom of the container or on to the mobile support or on to respective uppermost layer of the stack, falling of the elongated articles when the conveying arms are withdrawn being prevented.

The loading apparatus can also be used for the loading of elongated articles in the reverse direction, i.e. from a container to a reception station.

BRIEF DESCRIPTION OF THE DRAWING

The above and other features of the present invention will now be described in detail with reference to the accompanying drawing in which.

SPECIFIC DESCRIPTION

Figure 6:
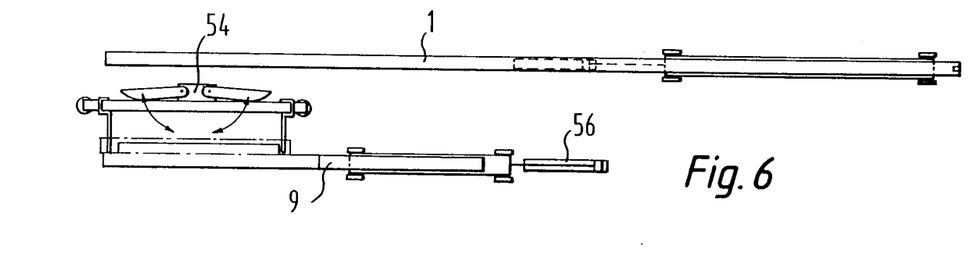
FIG. 6 shows a diagrammatic plan view of the loading apparatus shown in FIG. 5, without the container however.

A loading apparatus according to a first embodiment of the invention is shown in FIGS. 1 to 6. It has a first conveying device, consisting of a plurality of conveying beams 1, for transporting e.g. elongated articles 3 coming along on a roller table 2 at a supply station in the direction indicated by the arrow T to a layer-forming apparatus consisting of at least two stationary supports 4 (only one support 4 is shown in the drawing and referred to in the following) which serves for adjusting the width of layers 6 of elongated articles 3 to be stacked in a container 5. A fixed abutment 7 is provided on each support 4 at that side thereof which is remote from the roller table 2. A further fixed abutment 8 is provided between the roller table 2 and the stationary support 4. The two fixed abutments 7 and 8, which constitute an aligning and gathering apparatus, serve to push together and align in parallel manner the elongated articles 3 as will be described in more detail hereinafter. A second conveying device 9, which comprises a plurality of conveying cantilever arms 10, is intended for transport of elongated articles from the support 4 to the container 5, the direction of conveying being the same as between the roller table 2 and the support 4. Also provided is an elevatable and lowerable support 11 which serves to receive the stack 12 being formed in the container 5, and is adapted to be moved into and out of the container 5 through the bottom of the latter. As is described further in detail hereinafter, a magazine 13 for intermediate layer elements 21 which are arranged between the individual layers 6 of the stack 12 is provided adjacent each conveying arm 10 of the second conveying device 9, as is shown in FIG. 6. Thus, each magazine 13 is arranged between a conveying arm 10 and a conveying beam 10, i.e. that the number of magazines 13 corresponds to the number of conveying arms 10.

Figures 4A, 4B:
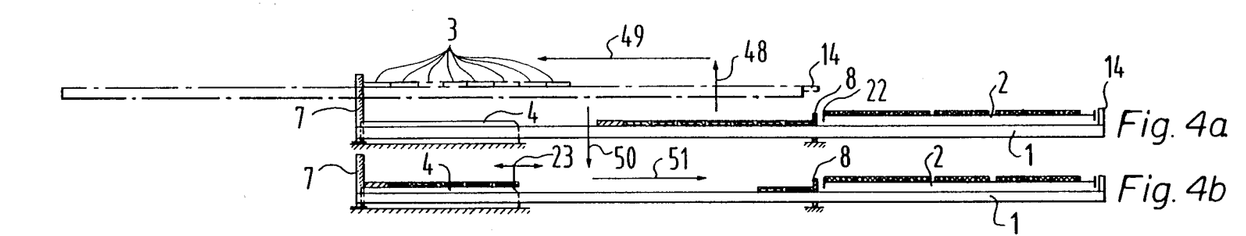
FIGS. 4a–4d show a similar side view of the loading apparatus according to the first embodiment of the invention to FIG. 3, in different positions at the two working steps of the loading apparatus which follow the working steps shown in FIG. 3.
Figures 4C, 4D:
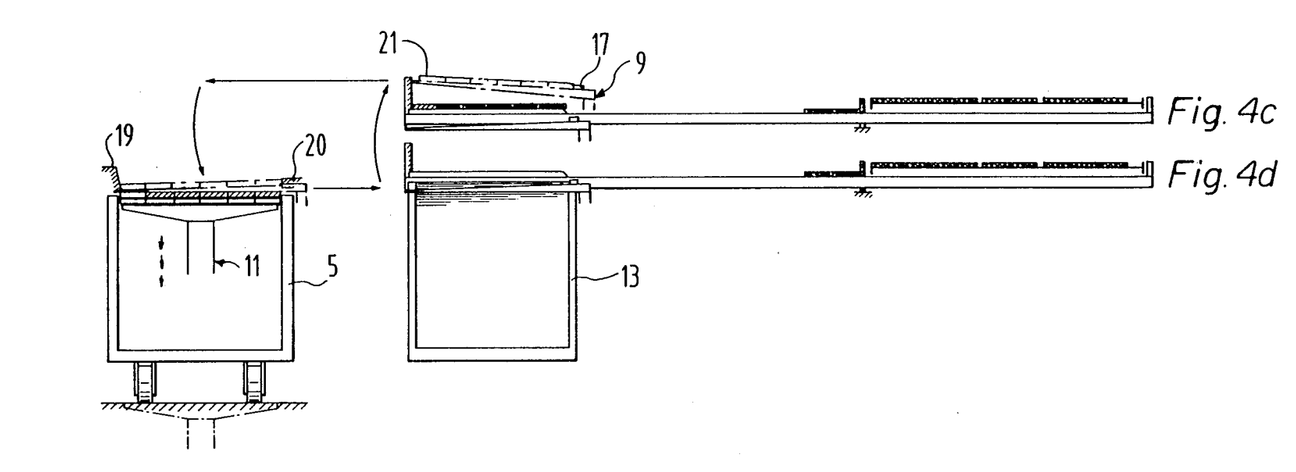
Figure 5:
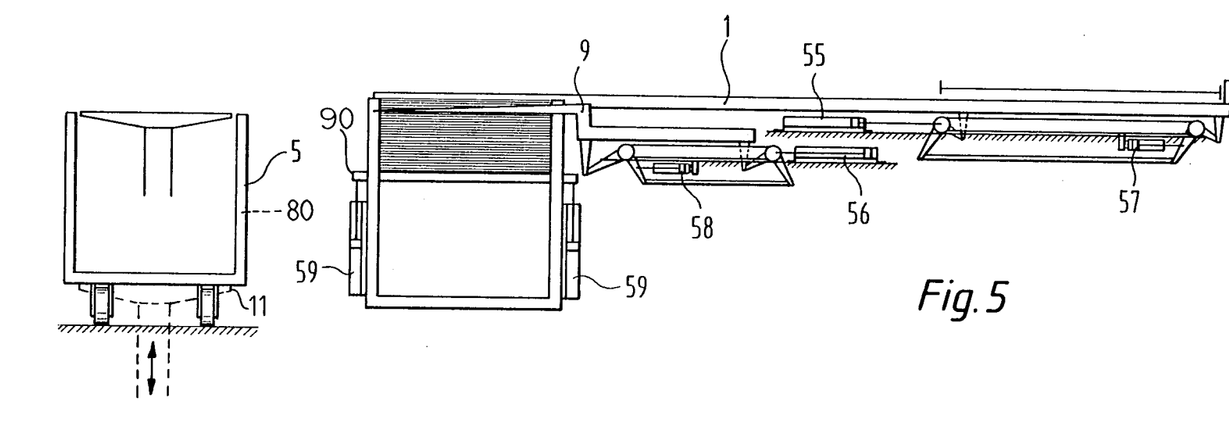
FIG. 5 shows a diagrammatic side view of the loading apparatus according to the first embodiment of the invention, which also illustrates a drive apparatus for the conveying beams, conveying arms and the intermediate layer stack.

The conveying beams 1 are situated horizontally, and paralel to one another. The number of conveying beams, and the spacing between each two neighbouring conveying beams, are so chosen that excessive sagging of the e.g. elongated articles during transort on the conveying beams 1 is obviated. But at least two conveying beams are provided, although only one conveying beam is to be seen in the loading apparatus in the drawings. The conveying beams 1 are aligned in the conveying direction T and movable synchronously in and oppositely to the conveying direction T, and are also elevatable and lowerable in the vertical direction. The elongated articles 3 to be conveyed rest on the topside of the conveying beams 1 and are so orientated that their longitudinal direction extends transversely to the longitudinal direction of the conveying beams 1. Accordingly, conveying of the elongated articles 3 from the roller table 2 to the support 4 is effected substantially transversely to the length of the elongated articles 3. In the lowered position the topside of the conveying beams is below the underside of the elongated articles lying on the roller table 2, so that the conveying beams in the lowered position are movable below the articles 3 lying on the roller table 2. In the lowered position, however, the topside of the conveying beams 1 is also situated below the horizontal supporting surface of the stationary support 4. The conveying beams 1 are liftable such that the elongated articles 3 lying on them can be moved over and beyond the abutment 8 when conveying from the roller table 2 to the support 4, this abutment being situated between the conveying beams 1 in the region between the roller table 2 and the support 4. At the right-hand end of the conveying beams 1 in the drawings there is provided an abutment 14 which can be swung downwardly and upwardly again, as is shown in FIG. 4 in the illustration of the sixth working step. The conveying beams are movable upwards and downwards by hydraulic cylinders 57 and horizontally by hydraulic cylinders 55, through suitable linkages (FIG. 5), and the movements of the conveying beams 1 are controllable in accordance with requirements.

The stationary support 4 has a horizontal supporting surface as already mentioned, and is situated between the conveying beams 1. The supporting surface of the support 4 projects above the topside of the conveying beams 1 when the latter are in the lowered position, and is situated below the underside of the articles lying on the conveying beams 1 when the conveying beams 1 are situated in the raised position. The supporting surface of the support 4, has a width B which is defined between that vertical abutment surface of the abutment 7 which is directed towards the conveying direction T on the one hand and that edge of the supporting surface of the support 4 which is directed towards the roller table 2 on the other hand, determines the quantity of articles 3 disposable on the supporting surface of the support 4 if they are arranged thereon thereon their longitudinal direction extending transversely with respect to the width of the supporting surface and with their longitudinal sides lying against one another. The articles arranged in the manner described on the supporting surface of the support 4 form at the same time a layer 6 of the stack 12 of elongated articles being formed in the container 5. Therefore the quantity of articles accommodated on the supporting surface of the support 4 in the indicated arrangement determines the width of the layers of the stack 12. At the side facing towards the roller table 2, the support 4 has an end portion provided with is the upper end of a bevelled edge 15. The edge 15 of the support 4 can be e.g. telescopically slid-in and pulled out in and oppositely to the conveying direction T respectively, as is indicated by the arrow 23 in FIG. 1 in the illustration of the second working step, by providing each support 4 as two parts slidable within each other (FIG. 9) so that the supporting surface of the support 4 can be increased or reduced in its width. Accordingly, because of the dependence of the layer width of the stack 12 on the width B of the supporting surface of the support, the layer width of the stack can be increased or reduced by shifting the edge 15 of the support 4.

The two fixed abutments 7 and 8 are situated between the conveying beams 1, and their abutment surfaces extend vertically and face towards one another. The elongated articles 3 are movable over the top of the abutment 8 at conveyance from the roller table 2 to the support 4, whereas the abutment 7 projects above the topside of the conveying beams even in the elevated position of the conveying beams. When the elongated articles 3 are moved against the abutment surfaces of the fixed abutment 7 and 8, the fixed abutments 7 and 8 retain the elongated articles relatively to the conveying beams, and the elongated articles are pushed together transversely to their longitudinal extension and are aligned parallel to each other. The topside of the conveying beams 1 is provided with a suitable layer or coating such as e.g. synthetic plastic material or graphite, to avoid damaging the elongated articles as they slide when being pushed together. The co-operation of the conveying beams 1 and the fixed abutments 7 and 8 for pushing-together the long stock items is described in more detail hereinafter.

The second conveying device 9 comprises two or more than two conveying arms 10 aligned in the conveying direction T, and the number of conveying arms and their spacing from one another like the number and mutual spacing of the conveying beams 1 is chosen in dependence on the possible sagging of the articles 3, to be transported. At their rear end nearest to the roller table 2 the conveying arms 10 are connected to supporting members 16 as is shown in the drawings. The supporting members 16 and the conveying arms 10 of the conveying device 9 are movable together in and oppositely to the conveying direction T, and also liftable and lowerable in the vertical direction. Additionally the supporting members 16 and the arms 10 of the conveying device 9 are together tiltable in such a way that the free ends of the conveying arms 10 are liftable higher than their rear ends, as the drawings show. At the rear end of the conveying arms 10 there is secured to the topside an abutment 17 against which the articles 3 lying on the conveying arms 10 can bear when the conveying arms 10 are tilted rearwards. Therefore the abutment 17 prevents the articles lying on the conveying arms from rolling or slipping off over the rear ends of the conveying arms when the conveying arms are tilted rearwards. The surfaces of the conveying arms 10 are flat at their topside and underside, and form an acute angle at the free end of the conveying arms 10. When the conveying arms 10 are not in the rearwardly tilted position the underside of the conveying arms 10 extends horizontally, whereas the topside of the conveying arms is inclined downwardly towards the free ends. The slope at the topside of the conveying arms formed by the tapering shape of the conveying arms in the non-tilting position facilitates the pushing-off of the articles lying on the conveying arms over the free ends of the conveying arms on to the topside of the liftable and lowerable support 11 or on to the uppermost layer of the stack 12.

The container 5 is U-shaped in cross-section, its opening for loading and unloading being situated at the top end. In its bottom it has an opening 10 through which the support 11 can be introduced into the container and moved out therefrom again. Transport wheels 18 are mounted on the underside of the bottom of the container 5.

Fixed abutments 19 and 20 are provided above the container 5, one at each side respectively. The fixed abutment 19 is so arranged that elongated articles lying on the conveying arms 10 can bear against it when in the loading of the container the conveying arms are in the non-tilted position, wherein the topside of the conveying arms is forwardly inclined. The fixed abutment 20 is so arranged that when the conveying arms 10 are withdrawn the elongated articles lying on said arms abut against it and as a result are stripped off over the free ends of the conveying arms.

The liftable and lowerable support 11 consists of a plurality of T-shaped supporting members the number of which and the spacing of which from one another are so chosen that there is as little sagging as possible in the articles. The support 11 can be sunk into the floor so that the top edge of the T-shaped supporting members is in the floor plane. The lowered position of the support 11 is shown in dot-dash lines in the drawings. The support 11 is also lowerable stepwise from the fully elevated position, each step corresponding to the height of a layer of the stack 12, so that during the loading operation the uppermost layer of the stack 12 on to which the articles lying on the conveying arms 10 of the conveying fork 9 are stripped off is arranged at the same height. The T-shaped supporting members of the support 11 are shown in broken lines in the drawings. The support 11 is driven by a drive device of conventional type which is not shown.

Each intermediate layer magazine 13 is also U-shaped in cross-section and is arranged in the vicinity of the fixed support 4. The intermediate layers 21 are stacked in the respective intermediate layer magazine 13 on a pedestal 90 and elevatable by means of lifting cylinders 59, the uppermost always being pushed by means of pivotable arms 54 (FIG. 6) on to the associated arm 10 of the conveying device 9 before it lifts the articles from the support 4.

Driving of the conveying device 9 is obtained in the horizontal direction by a hydraulic cylinder 56 and in the vertical direction by a hydraulic cylinder 58, via pivotable linkage, as FIG. 6 shows.

All the movements including the lifting and lowering movements of the conveying beams 1, of the conveying device 9 and the support 11, are controllable in accordance with a predetermined cycle programme, so that the articles can be manipulated from the roller table 2 to the container 5 without damage and without manual intervention.

The loading apparatus according to the invention operates as follows.

Figures 1A, 1B:
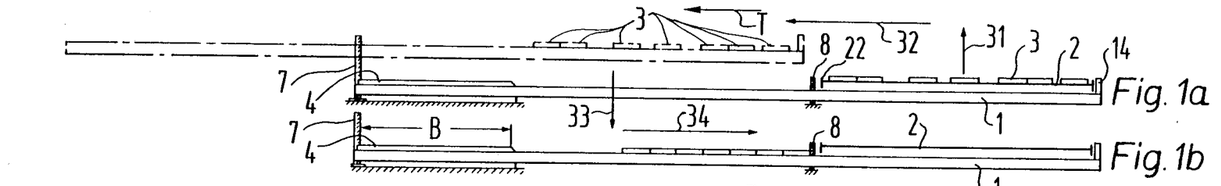
FIGS. 1a–1f show a diagrammatic side view of a loading apparatus according to a first embodiment of the invention in three successive working steps.
Figure 1C:
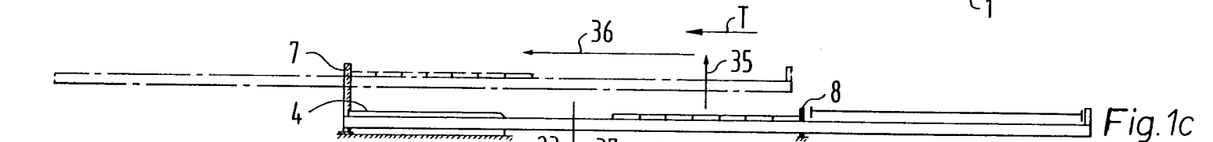
Figures 1D, 1E, 1F:
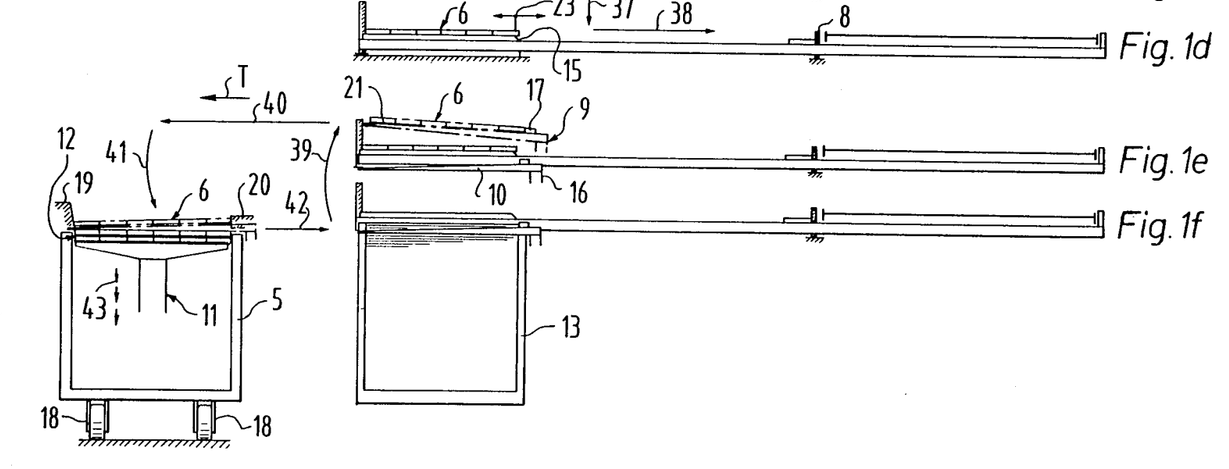

FIG. 1 illustrates the transporting of a plurality of articles 3 lying on the roller table 2 in three successive working steps into the container 6. It is assumed that the articles 3 lie on the roller table 2 in a single plane, in oblique positions and in any number within the limits imposed by the width of the roller table 2. At the beginning of the first working step the conveying beams 1 are in the lowered position and displaced to the right so that they project with their right-hand end below the articles 3 situated on the roller table 2. The loading apparatus is situated in the initial position A at the first working step, as shown in FIG. 1. Then the conveying beams 1 take over the articles lying on the roller table 2 by a vertical travel in the direction of the arrow 31, and convey them by a horizontal movement in the direction of the arrow 32 or in the conveying direction T over a lateral guide 22 of the roller table 2 and over the fixed abutment 8 into a position wherein the articles 3 are situated to the left of and above the fixed abutment 8. Then the conveying beams 1 are lowered in the direction of the arrow 33 and moved to the right in the direction of the arrow 34 or in the direction opposite to the conveying direction T, so that the elongated articles 3 are moved against the consequently fixed abutment 8 and pushed together transversely to their length. The articles 3 are now aligned parallel to one another and there are no longer any spaces between them. As they are pushed together the elongated articles 3 slide on the surface of the conveying beams 1, the sliding coating on the conveying beams 1 preventing damage to the surface of the elongated articles 3. The loading apparatus is now in the end position E at the first working step.

The initial position A of the loading apparatus at the second working step corresponds to the end position of the loading apparatus at the first working step. Starting from this position the conveying beams 1 are lifted in the vertical sense in the direction of the arrow 35 and are then moved in the direction of the arrow 36 or in the conveying direction T horizontally towards the left. At the end of this horizontal movement the elongated articles 3 are situated at the fixed abutment 7 and above the stationary support 4. Then the conveying beams 1 are lowered in the direction shown by the arrow 37, some of the elongated articles 3 lying on said beams coming to lie on the horizontal supporting surface of the stationary support 4. The number of articles 3 situated on the supporting surface of the stationary support 4 is determined by the width B of the supporting surface of the support 4. These elongated articles constitute one layer 6 of the stack of elongated articles to be formed in the container 5 in the succeeding third working step. Those articles which cannot be accommodated on the supporting surface of the support 4 are further lowered with the conveying beams 1 whereby the article adjacent to the edge of the supporting surface 4 will slide onto the conveying beam 1 when its situated centre of gravity is situated to the right of this edge. The width B of the supporting surface of the support 4 is so adjustable that the layer 6 of articles 3 formed on said surface is of such width that it only just fits into the container 5 and that the dividing line between the layer 6 of articles 3 which is formed on the support 4 and those articles 3 which can no longer be accommodated on the supporting surface of the support 4 coincides with the sloping edge 15 of the support 4. After the conveying beams 1 have been lowered in the direction of the arrow 37 they are moved horizontally in the direction of the arrow 38 or oppositely to the conveying direction T towards the right, so that those articles lying thereon which cannot be disposed on the supporting surface of the support are moved against the fixed abutment 8. In the illustrated example only one elongated article has been conveyed back to the fixed abutment 8. The loading apparatus is now in the end position E at the second working step. If at the end of the second working step the support 4 is not sufficiently covered by articles to form a complete layer 6 and further articles are prepared on the roller table 2, the second working step would be repeated as often as needed to fill the layer on the support 4. In the end position E of the loading apparatus at the second step the conveying beams 1 are situated in the same position as in the end position E of the loading apparatus at the first working step.

The distances travelled by the conveying beams 1 in the upward direction and in the downward direction and the length of the horizontal movements in and the oppositely to the conveying direction T are of equal amount in the two working steps.

During the third working step the conveying beams 1 are stationary. The conveying arms 10 now lift the layer 6 of elongated articles 3 from the supporting surface of the support 4 by an upward movement in the direction of the arrow 39. In this operation the arms 10 of the conveying device 9 are tilted rearwards, so that the free ends of the arms 10 are at a higher level than the rear ends of the arms 10. Because of the sloping position of the conveying arms 10 long stock items cannot slip off or roll off over the free ends of the conveying arms 10 if the elongated articles are round stock. Before the conveying arms 10 lift the layer 6 of elongated articles 3 from the support 4, intermediate layers or sheets 21 from the intermediate layer magazine 13 are pushed on the conveying arms, so that the articles of layer 6 lie on the intermediate layers 21. The elongated articles 3 of the layer 6 are then conveyed by a horizontal movement of the conveying device 9 in the direction of the arrow 40 or in the conveying direction T pass the abutments 7 to over the container 5 and then lowered in the direction of the arrow 41, the conveying arms 10 being tilted forwardly, so that the underside of the conveying arms extends horizontally and the topside of the conveying arms, together with the intermediate layers 21 and the layer 6, are inclined forwardly. In this position the conveying arms 10 of the conveying device 9 are situated with their underside on the surface of the uppermost layer of the stack formed in the container 5, or they are situated in the immediate vicinity of this layer, but without being in physical contact therewith. In this position the elongated articles resting on the arms 10 of the conveying device 9 bear against the abutment 19 so that they do not roll off or slide off from the conveying arms 10 despite the inclination of the topside of the arms 10 of the conveying device 9. Then the conveying device 9 is withdrawn by a horizontal movement in the arrow direction 42 or in the direction opposite to the conveying direction T, the abutment 20 holding fast the layer 6 of articles 3 together with the intermediate layers 21 so that the layer 6 of elongated articles 3 together with the intermediate layers 21 is deposited on the uppermost layer of the stack 12. Because of the intermediate layers 21 the layer 6 or any further layer of elongated articles is deposited as an integral whole on the uppermost layer of the long stock stack 12 each time. The surface of the elongated articles also cannot be damaged when the conveying arms 10 are withdrawn, since no relative movement takes place between the elongated articles and the intermediate layers 21 when the conveying arms 10 are withdrawn.

After the layer 6 of elongated articles 3 has been deposited on the stack 12, the support 11 is lowered by the amount of the height of the layer 6, so that the surface of the layer 6 is situated at the same height at which the surface of the now penultimate layer of the long stock stack 12 was previously situated. Since after each depositing of a layer of elongated articles on the stack 12 the support 11 is lowered by the amount of the height of the last-formed layer, the general result is a stepwise descent of the support 11, this being indicated by the arrow series 43. When the stack 12 has a number of layers of articles sufficient to fill the container 5, the support 11 is lowered through the openings in the bottom of the container 5, the lower layer of the stack 12 coming to lie on the bottom of the container 5. In its lower position the support 11 is sunk in the floor, so that its surface is at the same level as the floor. This position of the support 11 is indicated with dot-dash lines in the drawings. The container 5 can then be transported away and replaced with an empty container. The container 5 can either be wheeled away or lifted away with a crane.

At the end of the third working step the loading apparatus is in position E and the working cycle can begin anew.

Figures 2A, 2B:
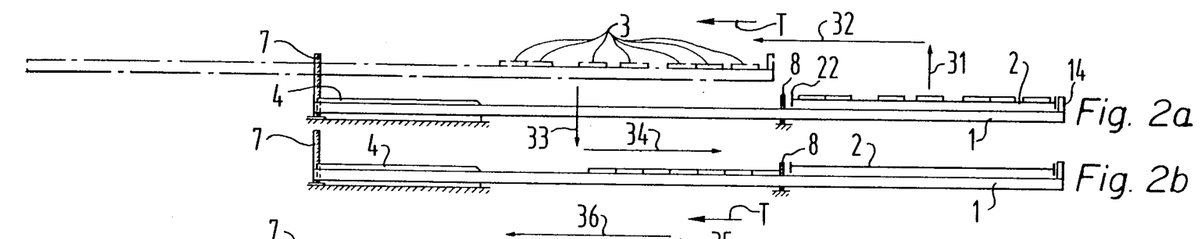
FIGS. 2a–2f show a similar side view of the loading apparatus according to the first example of embodiment of the invention of FIG. 1, showing the same positions of the loading apparatus with the same working steps as in FIG. 1, but illustrating the general case that after each working step elongated articles are again lying ready for loading on a roller table.
Figures 2C, 2D, 2E, 2F:
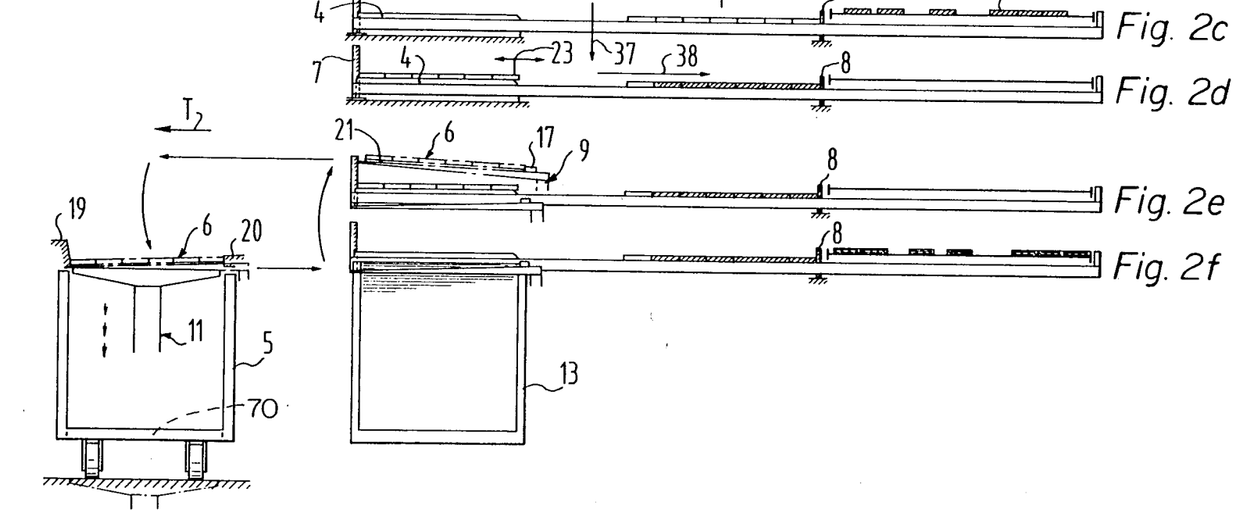

FIG. 2 shows substantially the same working cycle as in FIG. 1, but the general case is assumed that before the second working step and during the third working step new elongated articles arrive on the roller table. To make clear the loading apparatus working cycle illustrated in FIG. 2 the elongated articles arriving at the roller table 2 before the second working step and during the third working step are shown with different hatching, whilst the articles lying ready at the beginning of the first working step on the roller table 2 are not hatched. The first working step of the working cycle according to FIG. 2 is identical to the first working step of the working cycle shown in FIG. 1 and thus needs no further explanation. In the second working step of the working cycle shown in FIG. 2, in contrast to the second working step of the working cycle according to FIG. 1, when the conveying beams 1 are moved upwards in the direction of the arrow 35 further elongated articles 3 are lifted from the roller table 2. The separating of elongated articles from those which can be accommodated on the support 4 is carried out as in the case of the working cycle shown in FIG. 1. In the subsequent horizontal movement of the conveying beams 1 in the direction of the arrow 38 or oppositely to the conveying direction T, the further articles appearing on the roller table before the second working step are pushed together with the remaining articles which were already available on the roller table 2 at the beginning of the first working step and cannot be accommodated on the support 4, so that they are aligned in parallel formation and there are no longer any spaces between them.

During the third step of the working cycle according to FIG. 2 the elongated articles pushed together by the abutment 8 remain lying on the conveying beams 1, whilst new articles appear on the roller table 2, and the transporting of the elongated articles lying on the support 4 into the container takes place exactly as in the third working step of the working cycle according to FIG. 1.

Figure 3A:
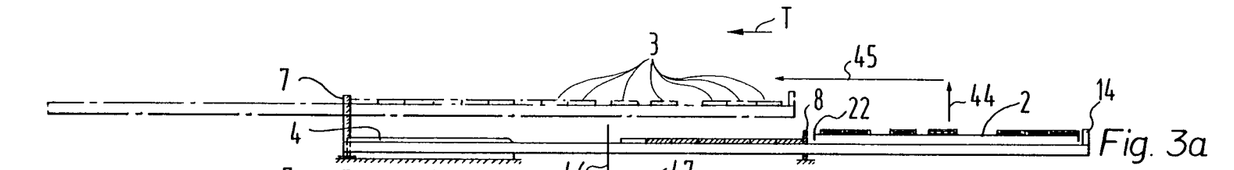
FIGS. 3a–3d show a similar side view of the loading apparatus according to the first example of embodiment of the invention to FIG. 2, in different positions at the two working steps of the loading apparatus which follow the working steps shown in FIG. 2.
Figure 3B:
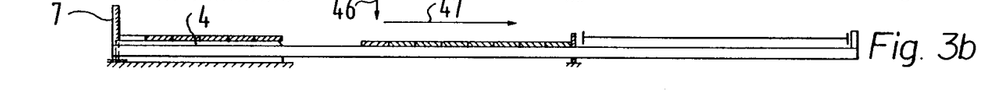
Figures 3C, 3D:
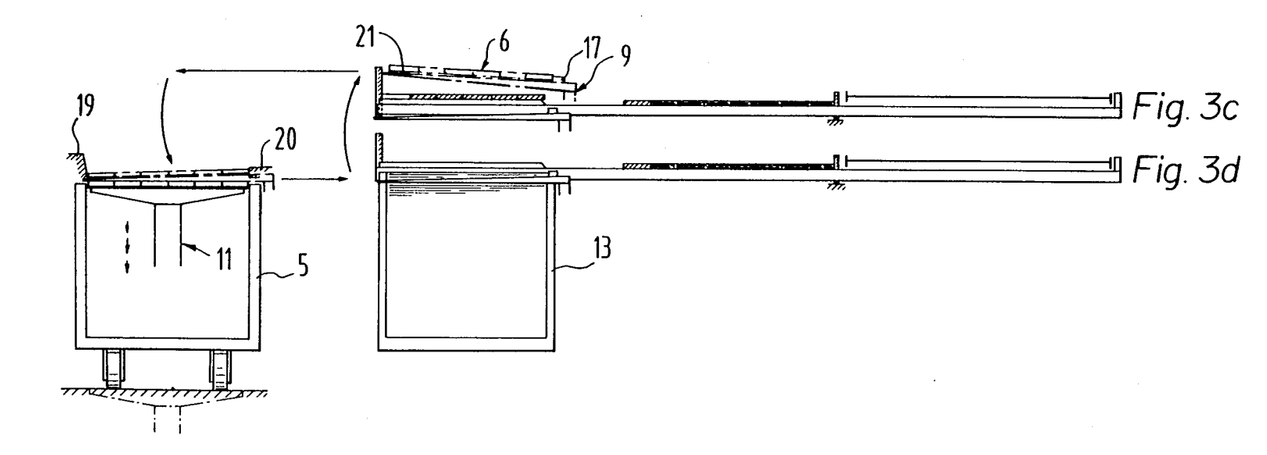

FIG. 3 shows the continuation of the working cycle or sequence shown in FIG. 2. At the beginning of the fourth working step, the loading apparatus being in the initial position A, which corresponds to the end position E in the third working step of the working sequence shown in FIG. 2, the conveying beams 1 are lifted in the arrow direction 44 and the elongated articles which have appeared on the roller table 2 during the third step of the working sequence shown in FIG. 2 are lifted from the roller table 2 and moved upwardly together with the elongated articles pushed together at the abutment 8. Then follows the horizontal movement of the conveying beams in the direction of the arrow 45, or in the conveying direction T, and the elongated articles which last appeared on the roller table are moved over the side guide 22 of the roller table 2 and the abutment 8. Then the conveying beams 1 are lowered again in the arrow direction 46, and a quantity of elongated articles corresponding to the width of the supporting surface of the support 4 are deposited on the supporting surface of the support 4, whilst the other elongated articles remain on the conveying beams 1. In the illustrated example the layer of articles lying on the support 4 is composed of a article which was on the roller table 2 already at the beginning of the first working step of the working sequence according to FIG. 2, and some of the elongated articles which appeared on the roller table 2 before the second working step of the working sequence according to FIG. 2. Those elongated articles which cannot be accommodated on the support 4 are moved towards the right by a horizontal movement of the conveying beams 1 in the arrow direction 47 or the direction opposite to the conveying direction T, and are retained by the abutment 8 and pushed together as a result. In the fifth working step of the working sequence according to FIG. 3 the elongated articles lying on the support 4, just as in the case of the third step of the working sequence according to FIG. 2 and the third step of the working sequence according to FIG. 1, are lifted from the support 4 by the conveying arms 10 and transported into the container 5, where they are lowered by the support 11. The conveying beams 1 remain in a state of rest during this operation. At the end of the fifth working step of the working sequence shown in FIG. 3 the loading apparatus is in the end position E.

FIG. 4 shows the continuation of the working sequence shown in FIG. 3, but assuming the case where not all articles lying on the roller table at the beginning of the sixth working step had room on the conveying beams 1 after the elongated articles 3 lying thereon have been displaced at the abutment 7 as illustrated. Therefrom there is no full vertical travel in the arrow direction 48 as in the fourth step of the working sequence according to FIG. 3, and instead the conveying beams 1 are only lifted sufficiently so that at the following horizontal movement in the arrow direction 49 or in the conveying direction T the article lying on the conveying beams 1 are moved over the support 4 and on the other hand the elongated articles lying on the roller table 2 are not lifted off. The abutment 14 is swung downwards, so that no contact occurs between the abutment 14 and the elongated articles 3 situated on the roller table 2. Following the horizontal movement in the direction of the arrow 49 is the lowering movement of the conveying beams 1 in the direction of the arrow 50 at which, as already described, those article which cannot be accommodated on the supporting surface of the support 4 are separated from those which are supported on the supporting surface of the support 4. Then follows the horizontal movement in the direction of the arrow 51 so that those elongated articles which no longer can be accommodated on the support 4 are carried back to the abutment 8.

In the seventh working step of the working sequence according to FIG. 4 the elongated articles lying on the support 4 are lifted off again by the conveying arms 10 and transported into the container 5.

Because of the features of the sixth and seventh steps of the working sequence shown in FIG. 4 sufficient space has been provided on the conveying beams 1 so that in the eighth step, not shown, the elongated articles situated on the roller table 2 are now taken up and also transported into the container. In the illustrations of the sixth and seventh steps of the working sequence according to FIG. 4 the initial and end positions of the loading apparatus are again designated with the letters A and E.

Instead of the container shown in the drawings for receiving the elongated articles it would also be possible to use two or more stacking trestles. Alternatively a container with a closed bottom could be used, but with its side wall open in the region of the conveying arms 10. A suitable opening in the side wall is designated by reference numeral 80 in FIG. 5. Such a container could then be placed directly on the support 11. For loading the container a vertical lift would have to be made with the support 11 in that case at each layer, to convey the elongated articles over the side wall of the container. Boxes may be mentioned as an example of such containers.

Where appropriate the bundling of sufficiently stable elongated articles may also be carried out without lateral guides.

Instead of sheet-form intermediate layers, paper webs or plastic film can be used for separating layers over the entire length of the elongated articles. In suitable circumstances it is possible to omit completely intermediate layers or other layer-separating devices.

Figures 7A, 7B, 7C:
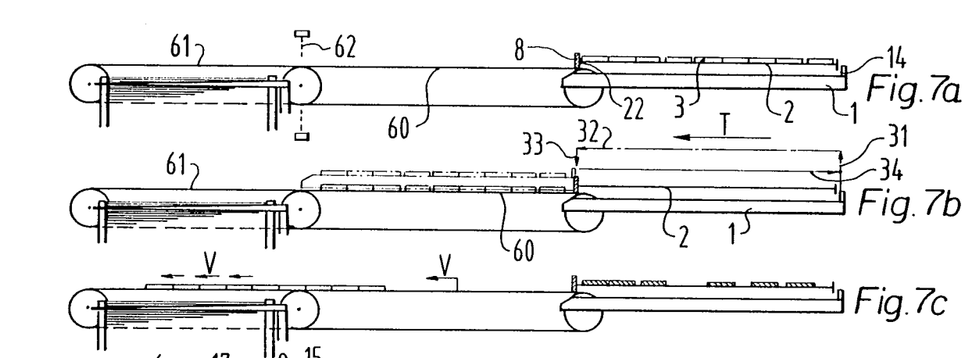
FIGS. 7a–7e show a diagrammatic side view of a loading apparatus according to a second embodiment of the invention in four successive working steps and FIG. 8 shows a diagrammatic side view of a loading apparatus according to a third embodiment of the invention.
Figures 7D, 7E:
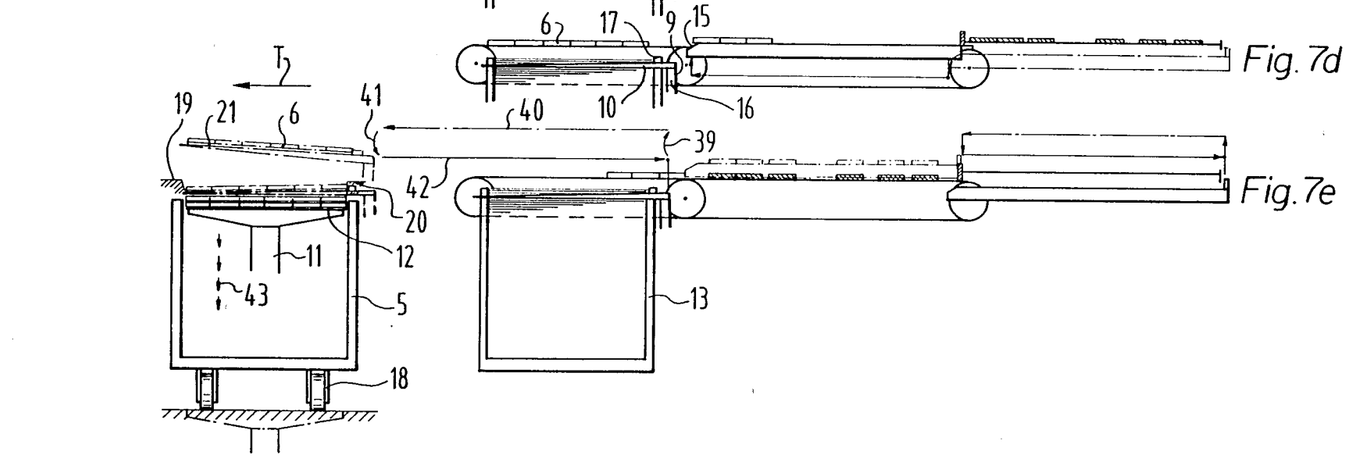

FIG. 7 shows a loading apparatus according to a second embodiment of the invention, like reference numerals being used for like parts.

The loading apparatus according to FIG. 7 comprises a first conveying device which has a plurality of conveying beams 1 with which elongated articles 3 arriving on a roller table 2 at a supply station are transported in the direction of the arrow T to an aligning and gathering apparatus which has two conveyor belts 60, 61 arranged in succession to one another. The conveying beams 1 are driveable and constructed substantially like the conveying beams or loading apparatus of the first embodiment. A difference to the conveying beams of the loading apparatus according to the first example of embodiment is that the conveying beams 1 of the present loading apparatus are shortened to roller table width, and comprise at their ends remote from the roller table 2 sloping surfaces 15 the function of which will be explained further hereinafter. The two conveyor belts 60, 61 are so arranged that in side view, as shown in the drawings, a continuous horizontal supporting surface is formed for the elongated articles 3. The first conveying device transports the elongated articles 3 to the first conveyor belt 60, which is adjacent to the roller table 2. The conveyor belt 60 conveys the elongated articles 3 to the conveyor belt 61, and they are simultaneously aligned and gathered, as will be described further hereinafter. A second conveying device 9, 10 serves to convey the elongated articles lying on the second conveyor belt 61 from the second conveyor belt 61 to a container 5 into which the elongated articles are introduced layerwise and stacked accordingly. The second conveying device is operated and constructed just like the corresponding conveying device in the loading apparatus according to the first example of embodiment, so that it does not need more detailed description. The container 5 is also constructed like the container in the loading apparatus according to the first embodiment and therefore will not be described in detail.

The conveyor belts 60, 61 are movable intermittently and at the same speed, and their upper run moves in the conveying direction T. A control apparatus not shown here controls the operation of the second conveyor belt 61 in such a manner that at transfer from the first belt 60 to the second belt 61 the elongated articles 3 are aligned at right angles to the conveying direction T or parallel to the longitudinal axis of the container 5 and are pushed against one another to contact laterally, as will be described in more detail further hereinafter. The control aparatus comprises two or more photoelectric barriers 62 which are distributed over the length of the articles 3 and whose optical axes extend in a vertical plane in which the common axis of the guide pulleys of the two belts 60, 61 is also situated, and the light sources and the corresponding photodetectors are situated respectively above and below the supporting surface of the belts 60, 61. For the sake of clarity the photoelectric barriers 62 are indicated only in the topmost illustration of the loading apparatus.

Associated with the second conveyor belt 61 is a layer-forming apparatus for which likewise there is provided a control apparatus which is not shown and which controls the operation of the two belts 60, 61 and the conveying beams 1 for layer forming.

The loading apparatus according to the second embodiment operates in the following way.

In the first working step the conveying beams 1 are lifted in the direction of the arrow 31, and they lift from the roller table 2 the elongated articles which are situated thereon. Then the conveying beams 1 with the elongated articles 3 lying on them are moved in the direction of the arrow 32 or in the conveying direction T over the first belt 60 and then in the direction of the arrow 33 below the level of the surface of the belt 60, whereat the elongated articles 3 are deposited on the belt 60.

In the second working step the first conveyor belt 60 is switched on to convey the elongated articles lying on it from the first belt 60 to the second belt 61. The second belt 61 runs at synchronous speed as soon as all the photo-electric barriers arranged over the entire length of the articles are actuated. If there is a space between two neighbouring elongated articles 3, the light beams can pass through unhindered, with the result that the control apparatus stops the second belt 61. Since the first belt 60 continues to run, the articles lying on it are pushed against the articles lying on the second belt, so that they come to abut on one another. As soon as the articles are pushed close together the photoelectric barriers are again actuated, and the belt 61 is set in motion again. The general effect of this kind of control is a stepwise advance of the belt 61, as indicated by the short arrow series V, whilst the first belt 60 is moved continously, as is indicated by the single relatively long arrow Va.

In the third working step both belts are stopped on the instructions of the control apparatus for the layer-forming apparatus when the layer 6 of elongated articles which is formed on the second belt 61 reaches a predetermined width adapted to the width of the container 5. Then the conveying beams 1 are lifted to such an extent that they lift from the first belt 60 the elongated articles which are lying on said belt. Then the advance of the belt 61 is actuated briefly, with the result that the layer 6 of elongated articles lying thereon is separated from the articles lying on the conveying beams 1. The layer width is so chosen that the vertical separation plane between the layer 6 and the articles remaining on the conveying beams 1 falls on the sloping surfaces 15 of the ends of the conveying beams 1.

The further transport of the layer 6 with the intermediate layers 21 to the container 5 is carried out in a fourth working step, and proceeds just as in the case of the loading apparatus according to the first example of embodiment.

If the remaining elongated articles disposed on the first belt 60 before the taking over of the layer 6 by the second conveying device 9, 10 has a smaller width than the preselected layer width, simultaneously with the take-over of the layer 6 the new articles provided on the roller table 2 in the meantime are brought by means of the first conveying device to the belt 60, and at the same time the left-over articles are conveyed from belt 60 to belt 61. The operation described above is shown in the drawings at the third and fourth working steps. If on the other hand the width of the remaining articles on belt 60 is equal to or greater than the preselected layer width a transporting cycle of the second conveying device 9, 10 takes place without further articles being conveyed from the roller table 2 to the first belt 60.

The first conveying device and the second conveying device 9, 10 in both embodiments can have a common drive for movement in the horizontal direction, but separate lifting drives. Moreover the surface of the first belt 60 can have a lower coefficient of friction than the surface of the second belt 61 so that the elongated articles on the first belt can easily be aligned and shifted, and the second belt offers relative considerable resistance to relative displacement.

Figures 8, 9, 10:
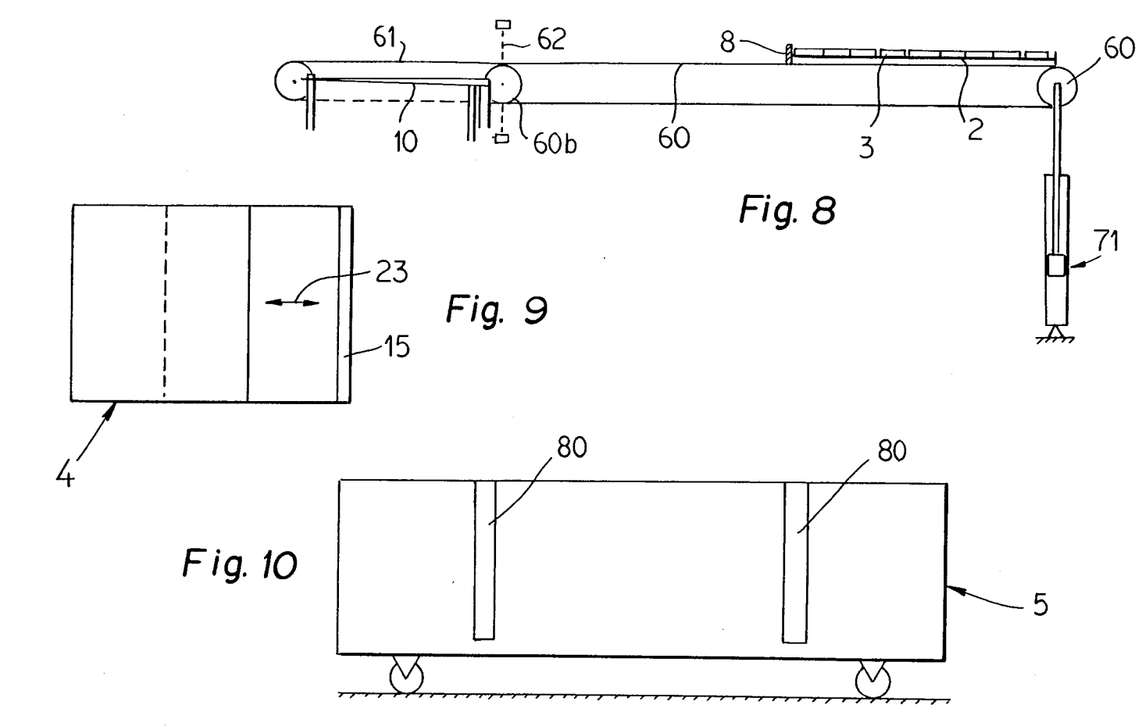

In a modified form of the loading apparatus according to the invention according to the second embodiment the conveyor belt 60 can be extended towards the roller table 2 and can carry out a lifting or tilting movement in the vertical direction so that by such a lifting or tilting movement it can convey the elongated articles 3 from the roller table 2 to run about a pair of spaced pulleys 60a and 60b. As shown in FIG. 8, a cylinder-piston unit 71 acts on the pulley 60a to lift the conveyor belt 60 at this point in a vertical direction so that the conveyor belt 60 is moved into an inclined position and swivels or is tilted about the pulley 60b and convey them then to the belt 61. Then instead of the conveying beams 1 there are provided lifting beams which are stationary in the conveying direction and carry out a vertical movement, and perform a vertical stroke for separating the layer.

Finally, it should be pointed out that the loading apparatus according to the present invention both as shown in the first embodiment and as shown in the second embodiment can also be used for the transporting of elongated articles in the reverse direction, that is to say for the destacking of packs of elongated articles.

I claim:

1. Apparatus for loading elongated articles between first and second stations, comprising:

first transport means for simultaneously lifting the elongated articles from said first station and conveying them along a predetermined path to an intermediate station;

adjusting means cooperating with said first transport means for aligning the elongated articles and forming a layer of contacting articles of predetermined width at said intermediate station;

second transport means for lifting said formed layer of elongated articles from said intermediate station, said second transport means defining a support surface upon which said layer of elongated articles is arranged when being lifted from said intermediate station and conveyed to said second station; and means for depositing at least one intermediate layer onto said support surface before said second transport means picks up said formed layer of elongated articles to transfer the latter from said intermediate station to said second station.

2. Apparatus as defined in claim 1 wherein said first transport means includes at least two beams arranged parallel to each other and defining a longitudinal axis, said beams being movable in a direction of said longitudinal axis and in a direction vertical thereto.

3. Apparatus as defined in claim 2 wherein said adjusting means includes a first stationary upright abutment arranged in-between two adjacent ones of said beams so that the elongated articles are pushed together during their transport by said beams in direction towards said abutment and being aligned transversely to their elongation.

4. Apparatus as defined in claim 2 wherein said adjusting means further includes at least two stationary supports spaced sufficiently from each other to allow secure placing of said layer of articles and having an upper surface of a width defining the width of said layer of elongated articles to be introduced into said second station.

5. Apparatus as defined in claim 4 wherein said support has at least one bevelled end portion for allowing slipping off and return of excess articles onto said beams.

6. Apparatus as defined in claim 5 wherein said adjusting means further includes a second stationary upright abutment arranged at the other end portion of said support and having a height extending beyond said beams when the latter are moved in vertical direction into their uppermost position so that the elongated articles are pushed together to be aligned upon movement of the articles towards said second abutment and prior to be transferred onto said support.

7. Apparatus as defined in claim 6 wherein said first abutment is of such a height that said beams are allowed to pass over said first abutment when being elevated in vertical direction in order to move the articles from said first station along said predetermined path.

8. Apparatus as defined in claim 4 wherein each support includes two parts telescopically slidable within each other to adjust the width of said upper surface of said support.

9. Apparatus as defined in claim 2 wherein each of said beams has a topside coated with a protective lining to increase sliding properties.

10. Apparatus as defined in claim 9 wherein said lining is made of graphite.

11. Apparatus as defined in claim 9 wherein said lining is made of synthetic plastic material.

12. Apparatus as defined in claim 1 wherein said second transport means includes at least two cantilever arms extending in a horizontal direction and being movable between said intermediate station and said second station so as to be able to pick up said layer of articles from said intermediate station and to transfer it into said second station.

13. Apparatus as defined in claim 12 wherein each of said cantilever arms has one end portion pivotally arranged about a fixed point and a free end portion so that upon pivoting of said cantilever arms said free end portion is at a higher lever than said one end portion.

14. Apparatus as defined in claim 13 wherein said transport means further includes a stop member arranged on said one end portion of each cantilever arm so as to prevent the articles from dropping off during pivoting of said arms into a tilted position.

15. Apparatus as defined in claim 13 wherein each of said cantilever arms has a flat topside and a flat underside converging at said free end so as to form an acute angle relative to each other.

16. Apparatus as defined in claim 12 wherein said means for depositing one intermediate layer onto said support surface includes a magazine containing a plurality of such intermediate layers, a pedestal accommodated within said magazine for supporting said intermediate layers, a lifting cylinder engaging on said pedestal for elevating the latter each time such an intermediate layer is taken up and deposited on the associated one of said cantilever arms so as to position the following one of said intermediate layers at the same level as said previous one, and pivotable arms aligned with said magazine for pushing each intermediate layer onto said associated cantilever arm.

17. Apparatus as defined in claim 16 wherein said intermediate layers are sheets of paper.

18. Apparatus as defined in claim 16 wherein said intermediate layers are sheets of plastic material.

19. Apparatus as defined in claim 12, and further comprising a support movable step-by-step in a direction vertical to said longitudinal axis and cooperating with said second transport means for allowing successive introduction and stacking of a plurality of such layers into the said second station each time at same level.

20. Apparatus as defined in claim 19 wherein said container has a bottom portion and a side wall provided with at least one opening, said movable support engaging said bottom portion of said container to move step-by-step the latter in said vertical direction so that upon lowering said container by said movable support said cantilever arms transport said layer of articles over said side wall and upon subsequent lifting of the container said cantilever arms deposit said layer within said container wherein said arms move along said opening during lifting and lowering of said container by said movable support.

21. Apparatus as defined in claim 19 wherein the other station is a container, each layer having a predetermined height, said movable support projecting into the container to allow stacking of said layers of elongated articles thereon and being lowerable by a portion corresponding to the height of said respective layer each time prior to the introduction of a further such layer.

22. Apparatus as defined in claim 21 wherein the container has an interior and a bottom portion provided with an opening for allowing said movable support to move through said opening into the interior of the container.

23. Apparatus as defined in claim 1 wherein said lifting means includes a conveyor belt defining a longitudinal axis and extending to said first station, said conveyor belt being movable in direction of said longitudinal direction and in a direction vertical thereto so as to be able to pick up articles from said first station and to transfer them along said predetermined path.

24. Apparatus as defined in claim 23 wherein said adjusting means includes a further conveyor belt extending in direction of said longitudinal axis successively with respect to said one conveyor belt which transports the articles onto said further conveyor belt, and a beam cooperating with said further conveyor belt and being movable in a direction vertical to said longitudinal axis so that upon determination of the predetermined width of a layer of elongated articles on said further conveyor belt, said beam is moved upwardly into its elevated position to take over further articles provided on said one conveyor belt thereby separating the layer of articles from said further articles.

25. Apparatus as defined in claim 1, and further comprising driving means for moving said first transport means and second said transport means in a horizontal and vertical direction.

26. A method of loading elongated articles between first and second stations, comprising the steps of:
   simultaneously lifting the articles from the first station and conveying them along a predetermined path to an intermediate station;
   aligning the articles to provide a formation of contacting articles of predetermined width at the intermediate station;
   lifting the formed layer from the intermediate station and conveying it to the second station for providing a stack of layers therein; and
   providing intermediate layers prior to said second lifting step so that each formed layer is placed on such intermediate layers when being transferred to said second station.

27. A method as defined in claim 26 wherein said aligning step includes positioning said aligned articles onto a supporting surface having a width corresponding to the predetermined width.

28. A method as defined in claim 26, and further comprising the step of supporting said stack of layers of elongated articles in said second station and lowering said stack of layers by a predetermined portion to position the respective uppermost layer each time at the same level.

29. A method as defined in claim 26 wherein said aligning step includes moving the articles against at least one abutment to cause the articles to be pushed together and to contact each other.

30. Apparatus for loading elongated articles between first and second stations, comprising:
   first transport means for simultaneously lifting the elongated articles from said first station and conveying them along a predetermined path to an intermediate station;
   adjusting means cooperating with said first transport means for aligning the elongated articles and forming a layer of contacting articles of predetermined width at said intermediate station; and
   second transport means for lifting said formed layer of elongated articles from said intermediate station, said second transport means defining a support surface upon which said layer of elongated articles is arranged when being lifted from said intermediate station and conveyed to said second station, wherein said adjusting means includes at least two conveyor belts defining a longitudinal axis and being arranged successively in direction of said longitudinal axis, said conveyor belts being intermittently movable with equal speed wherein one of said conveyor belts extends adjacent to said first transport means so as to pick up elongated articles therefrom and to transport them successively onto said other conveyor belt.

31. Apparatus as defined in claim 30 wherein said adjusting means further includes a control unit for regulating the motion of said other conveyor belt to allow alignment of the articles on said other conveyor belt when being transferred thereto from said one conveyor belt by interrupting the motion of said other conveyor belt until alignment of the articles upon transfer onto said other conveyor belt is obtained.

32. Apparatus as defined in claim 31 wherein said control unit includes a plurality of photoelectric barriers arranged between adjacent two of said conveyor belts and spaced over the articles in direction of their elongation.

33. Apparatus as defined in claim 31 wherein said adjusting means further includes a second control unit for regulating the motion of said two conveyor belts and said first transport means and for determining the width of a formed layer, said second control unit stopping said two conveyor belts when said layer has the predetermined width and causing said first transport means to move upwardly into its elevated position to pick up excess articles provided on said one conveyor belt and causing said other conveyor belt to move momentarily so as to separate the formed layer from said excess articles along a vertical separating plane.

34. Apparatus as defined in claim 30 wherein said lifting means includes at least two beams defining a longitudinal axis and being arranged parallel to each other, said beams, having one bevelled end portion which is remote to said first station and through which said separating plane extends.

35. Apparatus as defined in claim 30, and further comprising first driving means for moving said first transport means and said second transport means in a horizontal direction, second driving means for moving said first transport means in a vertical direction and third driving means for moving said second transport means in a vertical direction.

36. Apparatus as defined in claim 30 wherein said conveyor belts have a surface of different coefficient of friction.

37. Apparatus as defined in claim 36 wherein the surface of said other conveyor belt has a higher coefficient of friction than the surface of said one conveyor belt.

38. A method of loading elongated articles between first and second stations, comprising the steps of:
   simultaneously lifting the articles from the first station and conveying them along a predetermined path to an intermediate station;
   aligning the articles to provide a formation of contacting articles of predetermined width at the intermediate station by transferring the articles from one conveyor belt onto another conveyor belt and stopping intermittently the motion of the other conveyor belt so as to cause the articles to be pushed together when being transferred onto the other conveyor belt; and
   lifting the formed layer from the intermediate station and conveying it to the second station for providing a stack of layers therein.

39. A method as defined in claim 38, and further comprising the step of positioning intermediate layers onto the other conveyor belt before placing the layer of elongated articles thereon.

40. A method as defined in claim 38 wherein said aligning step includes determining the formation of elongated articles on the other conveyor belt, stopping the one and the other conveyor belt when having determined when a layer of the predetermined width is formed, and momentarily setting in motion the other conveyor belt to separate the formed layer from excess articles positioned on the one conveyor belt.

* * * * *